US012112725B2

(12) United States Patent
Fang et al.

(10) Patent No.: US 12,112,725 B2

(45) Date of Patent: Oct. 8, 2024

(54) IMAGE DISPLAY METHOD, IMAGE DISPLAY DEVICE, AND MOBILE TERMINAL CAPABLE OF DISPLAYING LOW-RESOLUTION DISPLAY IMAGE INFORMATION ON HIGH-RESOLUTION DISPLAY PANEL

(71) Applicant: TCL CHINA STAR OPTOELECTRONICS TECHNOLOGY CO., LTD., Shenzhen (CN)

(72) Inventors: Xiaoli Fang, Shenzhen (CN); Yu Wu, Shenzhen (CN)

( * ) Notice: Subject to any disclaimer, the term of this patent is extended or adjusted under 35 U.S.C. 154(b) by 0 days.

(21) Appl. No.: 17/622,241

(22) PCT Filed: Dec. 17, 2021

(86) PCT No.: PCT/CN2021/138979

§ 371 (c)(1),
(2) Date: Dec. 23, 2021

(87) PCT Pub. No.: WO2023/108577

PCT Pub. Date: Jun. 22, 2023

(65) Prior Publication Data

US 2024/0038202 A1 Feb. 1, 2024

(30) Foreign Application Priority Data

Dec. 13, 2021 (CN) ......................... 202111514233.X

(51) Int. Cl.
*G09G 5/391* (2006.01)
*G09G 3/36* (2006.01)

(52) U.S. Cl.
CPC ........... *G09G 5/391* (2013.01); *G09G 3/3611* (2013.01)

(58) Field of Classification Search
CPC .... G09G 5/391; G09G 3/3611; G09G 3/3406; G06T 3/4023
See application file for complete search history.

(56) References Cited

U.S. PATENT DOCUMENTS

| | | | | |
|---|---|---|---|---|
| 2001/0043759 A1* | 11/2001 | Eguchi | .................. | G06T 3/4023 382/299 |
| 2004/0046773 A1* | 3/2004 | Inoue | .................... | G06T 3/4023 345/698 |

(Continued)

FOREIGN PATENT DOCUMENTS

| | | |
|---|---|---|
| CN | 1080077 A | 12/1993 |
| CN | 107742504 A | 2/2018 |

(Continued)

OTHER PUBLICATIONS

International Search Report in International application No. PCT/CN2021/138979,mailed on Sep. 16, 2022.

(Continued)

*Primary Examiner* — Richard J Hong

(57) ABSTRACT

An image display method, an image display device, and a mobile terminal are provided, which are applied to a display panel including a plurality of pixel units having A pixel unit rows and B pixel unit columns, including: acquiring data image information including C pixel data rows and D pixel data columns of a plurality of pixel data, wherein C<A and/or D<B, and input the plurality of pixel data to multiple data lines and enable pixel unit rows, inputting the plurality of pixel data into a plurality data lines corresponding to the B pixel unit columns, and enabling the A pixel unit rows sequentially, to make at least part of the pixel units display according to a same pixel data.

17 Claims, 4 Drawing Sheets

(56) References Cited

U.S. PATENT DOCUMENTS

| | | | | |
|---|---|---|---|---|
| 2008/0143757 | A1* | 6/2008 | Furihata | G09G 3/3406 345/102 |
| 2008/0272994 | A1 | 11/2008 | Chen et al. | |
| 2015/0179150 | A1 | 6/2015 | Andrysco et al. | |

FOREIGN PATENT DOCUMENTS

| | | | |
|---|---|---|---|
| CN | 108630139 | A | 10/2018 |
| CN | 108922470 | A | 11/2018 |
| CN | 113077743 | A | 7/2021 |

OTHER PUBLICATIONS

Written Opinion of the International Search Authority in International application No. PCT/CN2021/138979, mailed on Sep. 15, 2022.

Chinese Office Action issued in corresponding Chinese Patent Application No. 202111514233.X dated Jul. 28, 2023, pp. 1-7.

* cited by examiner

IMAGE DISPLAY METHOD, IMAGE DISPLAY DEVICE, AND MOBILE TERMINAL CAPABLE OF DISPLAYING LOW-RESOLUTION DISPLAY IMAGE INFORMATION ON HIGH-RESOLUTION DISPLAY PANEL

FIELD OF INVENTION

The present application relates to display panel technologies, and more particularly, to an image display method, an image display device, and a mobile terminal.

BACKGROUND OF INVENTION

As mobile terminal users increase their requirements for the display image quality of mobile terminals, a resolution of display panels is increasing day by day. At this stage, high-resolution display panels have been applied to more and more mobile terminals.

Due to the scarcity of high-resolution film sources, a low-resolution film sources received by a system-on-a-Chip (SOC) are usually processed by a super resolution (SR) technology to obtain high resolution. Then, a high-resolution film source is sent to the high-resolution timing controller (TCON) for timing processing, and finally to a display panel for display.

However, since the high-resolution timing controller is expensive, displaying a low-resolution display image information on a high-resolution display panel will incur greater costs.

SUMMARY OF INVENTION

In order to solve the above problems or other problems, the present application provides an image display method, which is applied to a display panel including a plurality of pixel units, wherein the plurality of pixel units include A pixel unit rows and B pixel unit columns, and wherein the Image display method includes:

- acquiring display image information, wherein the display image information comprises a plurality of pixel data, and wherein the plurality of pixel data comprise C pixel data rows and D pixel data columns, and wherein $C<A$ and/or $D<B$;
- inputting the plurality of pixel data into a plurality of data lines corresponding to the B pixel unit columns; and
- enabling the A pixel unit rows sequentially, to make at least part of the pixel units display according to a same pixel data.

DESCRIPTION OF FIGURES

In order to explain a technical solution of the present application more clearly, the following will briefly introduce the accompanying figures needed in the description of the various embodiments according to the present application. Obviously, the accompanying figures in the following description are only for some embodiments of the present application. Those skilled in the art can obtain other figures based on these figures without inventive steps.

DETAILED DESCRIPTION OF EMBODIMENTS

Figure 1:
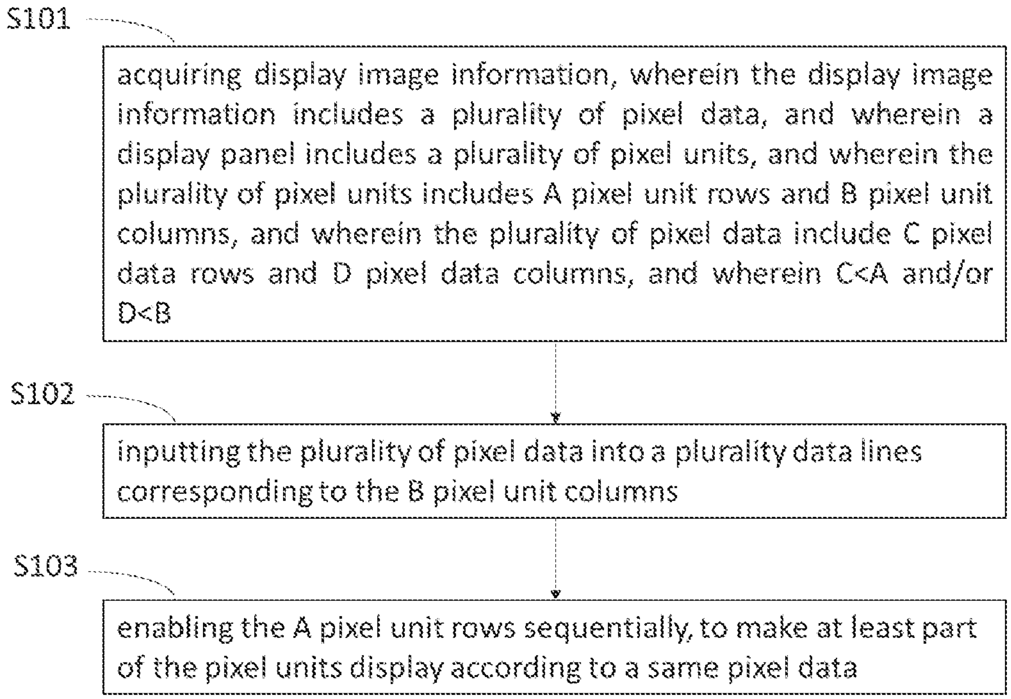
FIG. 1 is a schematic flowchart of an image display method provided by a first embodiment according to the present application.

The technical solutions in the embodiments of the present application will be clearly and completely described below in conjunction with the figures in the embodiments of the present application. Obviously, the described embodiments are only a part of the embodiments of the present application, rather than all the embodiments. Based on the embodiments of the present application, all other embodiments obtained by those skilled in the art without inventive steps shall fall within a protection scope of the present application.

In the description of the present application, it should be understood that the terms "center", "longitudinal", "transverse", "length", "width", "thickness", "upper", "lower", "front", "back", "left", "right", "vertical", "horizontal", "top", "bottom", "inner", "outer", "clockwise", "counterclockwise" and other directions or the positional relationship is based on the position or positional relationship shown in the figures, and is only for a convenience of describing the present application and simplifying the description, and does not indicate or imply that a pointed device or element must have a specific orientation, be constructed and operated in a specific orientation. Therefore, it cannot be understood as a limitation to the present application. In addition, the terms "first" and "second" are only used for descriptive purposes, and cannot be understood as indicating or implying relative importance or implicitly indicating a number of indicated technical features. Therefore, the features defined with "first" and "second" may explicitly or implicitly include one or more of the features. In the description of the present application, "plurality" means two or more than two, unless specifically defined otherwise.

In the description of the present application, it should be noted that the terms "installed", "connected", and "connecting" should be understood in a broad sense unless otherwise clearly specified and limited. For example, they can be fixed connected, detachable connected, or integrally connected. It can be mechanically connected, electrical connected, or communicated with each other. It can be directly connected or indirectly connected through an intermediate medium. It can be an internal communication of two components or an interaction of two components relation. For those of ordinary skill in the art, the specific meanings of the above-mentioned terms in the present application can be understood according to specific situations.

In the present application, unless expressly stipulated and defined otherwise, the "above" or "below" of a first feature of a second feature may include direct contact between the first feature and the second feature, or may include the first feature and the second feature not in direct contact but through other features between them. Moreover, the first feature "on", "above" and "upon" the second feature include the first feature being directly above and obliquely above the second feature, or merely indicating that a level of the first feature is higher than a level of the second feature. The first feature "below", "under" and "beneath" the second feature include the first feature directly below and obliquely below the second feature, or it simply means that the level of the first feature is smaller than the level of the second feature.

The following disclosure provides many different embodiments or examples for realizing different structures of the present application. In order to simplify a disclosure of the present application, the components and settings of specific examples are described below. Of course, they are only examples, and are not intended to limit the present application. In addition, the present application may repeat reference numerals and/or reference letters in different examples, and this repetition is for a purpose of simplification and clarity, and does not indicate a relationship between the various embodiments and/or settings discussed. In addition, the present application provides examples of various specific processes and materials, but those of ordinary skill in the art may be aware of the application of other processes and/or the use of other materials.

The present application is directed to a currently technology, because the high-resolution timing controller is expensive, and the low-resolution display image information is displayed on the high-resolution display panel, which will cause a relatively large cost problem. According to the present application, the embodiments is used to solve these problems.

In order to solve the above-mentioned problems, the present application provides an image display method. Please refer to FIG. 1. A specific process of the image display method provided by a first embodiment of the present application may be as follows:

- acquiring step S101: acquiring display image information, wherein the display image information includes a plurality of pixel data, and wherein a display panel includes a plurality of pixel units, and wherein the plurality of pixel units include A pixel unit rows and B pixel unit columns, and wherein the plurality of pixel data include C pixel data rows and D pixel data columns, and wherein C<A and/or D<B;
- first display step S102: inputting the plurality of pixel data into a plurality of data lines corresponding to the B pixel unit columns;
- second display step S103: enabling the A pixel unit rows sequentially, to make at least part of the pixel units display according to a same pixel data.

It should be noted that the above-mentioned first display step S102 can be performed before the above-mentioned second display step S103, can also be performed after the above-mentioned second display step S103, or can be performed simultaneously with the above-mentioned second display step S103. The present application does not impose limitations on this.

It is easy to understand that the plurality of pixel units on the display panel will be arranged in an array with a plurality of pixel unit rows or a plurality of pixel unit columns, and a plurality of pixel data will have a plurality of pixel data rows or a plurality of pixel data rows with different input time sequences. Pixel data rows with different input time sequences will be input into different pixel unit rows, and pixel data columns with different input paths will be input into different pixel unit columns.

It should be noted that a relationship between a number of the plurality of pixel units and a number of the plurality of pixel data may not be multiple times (for example, the pixel unit row is not an integer multiple times of the pixel data row and/or the pixel unit column is not an integer multiple times of the pixel data column, that is, A cannot divide C and/or B cannot divide D). and the relationship between the number of the plurality of pixel units and the number of the plurality of pixel data can also be multiples times (for example, the plurality of pixel units is n*m times the plurality of pixel data, wherein n is a quotient of A divided by C, and wherein m is a quotient of B divided by D). The multiple relationship between pixel unit rows and pixel data rows with different input time sequence and pixel unit columns and pixel data columns with different input paths can include the following three cases: 1. The number of pixel unit rows is a multiple of the number of pixel data rows with different input time sequences, and the number of pixel unit columns is equal to the number of pixel data columns with different input paths (that is, in this case, n is an integer other than 1, and m is 1); 2. The number of pixel unit rows is equal to the number of pixel data rows with different input time sequences, and the number of pixel unit columns is a multiple of the number of pixel data columns with different input paths (that is, in this case, n is 1, and m is an integer other than 1); 3. The number of pixel unit rows and the number of pixel data rows with different input time sequences, and the number of pixel unit columns and the number of pixel data columns with different input paths are all multiples relationships (that is, in this case, both n and m are integers other than 1).

Further, in this embodiment, the multiple relationships between the pixel unit rows and the pixel data groups with different input time sequences, and the pixel unit columns and the pixel data groups with different input paths are "1" in the above case.

It should be noted that the input paths are the paths selected when different pixel data columns are input to different data lines on the display panel. The above-mentioned input time sequence is the time sequence at which the scan line corresponding to the pixel unit row is input with a scan signal to enable the pixel unit row. The input paths of the D pixel data columns are at least partially different, and the input time sequences of the C pixel data rows are at least partially different. Specifically, the gate driving circuit on the display panel inputs scan signals to the scan lines according to the input time sequences to control the corresponding pixel unit rows. Pixel data columns with different input paths will be input to the data line through the port that is electrically connected to the data line. Input to the data line. In addition, the plurality of pixel data with the same input path will have different input time sequences, and the plurality of pixel data with different input time sequences will have different input paths. Further, when pixel data with different input paths is input to the corresponding data line, the scan line is input with the scan signal according to the above-mentioned input time sequence, the pixel unit corresponding to the scan line is enabled, and the pixel unit can receive pixel data from its corresponding data line and emit light.

It is easy to understand that since the number of the plurality of pixel units is n*m times the number of the plurality of pixel data, when each pixel data is applied to the n*m pixel units of the display panel for display according to the input time sequence and input path, the low-resolution display image information is displayed on the high-resolution display panel.

It should be noted that in this embodiment, the number of pixel unit rows is multiple of the number of pixel data rows. Therefore, it is necessary to apply one pixel data row at any input time sequence to multiple pixel unit rows, to achieve the low-resolution display image information displayed on the high-resolution display panel.

Figure 2:
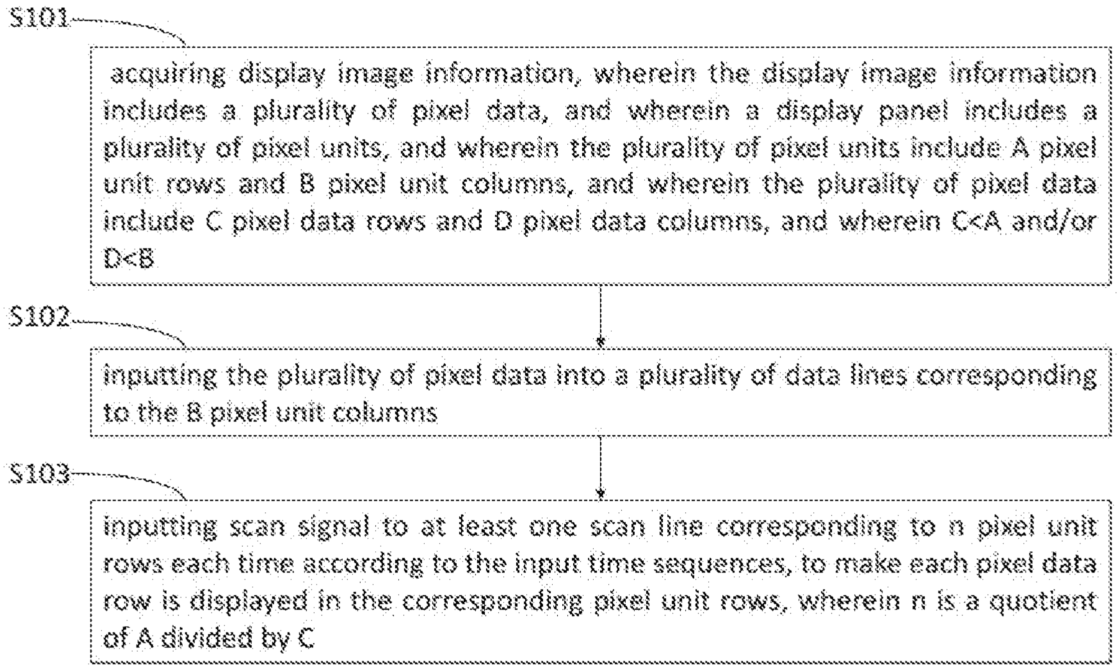
FIG. 2 is a further schematic flow chart of the image display method according to the first embodiment of the present application.

For example, please refer to FIG. 2. FIG. 2 is a further schematic diagram of the image display method according to the first embodiment of the present application. The image display method may specifically include:

acquiring step S101: acquiring display image information, wherein the display image information includes a plurality of pixel data, and wherein a display panel includes a plurality of pixel units, and wherein the plurality of pixel units include A pixel unit rows and B pixel unit columns, and wherein the plurality of pixel data include C pixel data rows and D pixel data columns, and wherein C<A and/or D<B;

first display step S102: inputting the plurality of pixel data into a plurality of data lines corresponding to the B pixel unit columns;

second display step S103: inputting scan signal to at least one scan line corresponding to n pixel unit rows each time according to the input time sequences, to make each pixel data row is displayed in the corresponding pixel unit rows, wherein n is a quotient of A divided by C.

It is easy to understand that, each time a scan signal is input to at least one scan line corresponding to n pixel unit rows, that is, n pixel unit rows are enabled at any input time sequence. For this input time sequence, each of the pixel data with different input paths will be applied to n pixel units. After A pixel unit rows are enabled, A/n pixel data rows with different input time sequences will be displayed in A pixel unit rows. That is, each pixel data is displayed in n pixel units of the display panel.

It should be noted that, in this embodiment, each n pixel unit rows compose one display pixel row group. The input time sequences of a same display pixel row group are the same. The same display pixel row group is composed of adjacent n pixel unit rows.

Further, in this embodiment, each scan line controls one pixel unit row. In some possible variant embodiments, each scan line may also control multiple pixel unit rows, or some scan lines control one pixel unit row, and some scan lines control multiple pixel unit rows.

Different from the prior art, the first embodiment according to the present application provides an image display method applied to a display panel. The image display method includes: acquiring display image information, and wherein a display panel includes a plurality of pixel units, and wherein the plurality of pixel units include A pixel unit rows and B pixel unit columns, wherein the display image information includes a plurality of pixel data, and wherein the plurality of pixel data include C pixel data rows and D pixel data columns, and wherein C<A and/or D<B, inputting the plurality of pixel data into a plurality of data lines corresponding to the B pixel unit columns, and then inputting scan signal to at least one scan line corresponding to n pixel unit rows each time according to the input time sequences, to make each pixel data row is displayed in the corresponding pixel unit rows, wherein n is a quotient of A divided by C. According to the image display method provided by the first embodiment of the present application, by controlling an enabling time sequence of the pixel unit and an input path of pixel data, a pixel unit row is enabled by at least any one of input time sequence. At this input time sequence, each of the pixel data with different input paths will be applied to n pixel units, so that a low-resolution display image information can be displayed on a high-resolution display panel without using a high-resolution timing controller.

Figure 3:
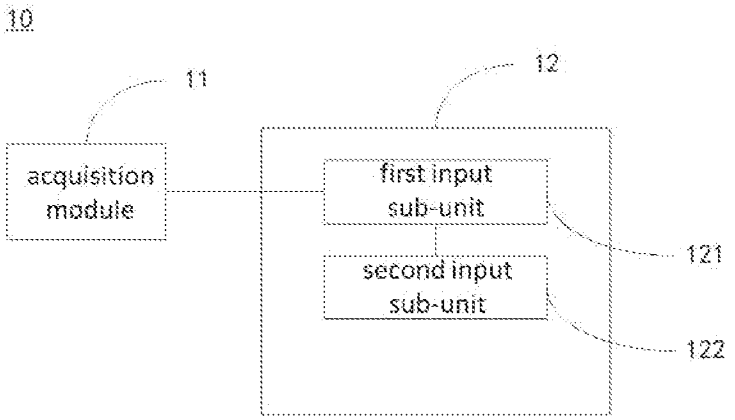
FIG. 3 is a schematic diagram of a structure of the image display device according to the first embodiment of the present application.

Please refer to FIG. 3. FIG. 3 is a schematic structural diagram of an image display device 10 according to the first embodiment of the present application. The image display method described above is applied to the image display device 10, and the image display device 10 may include:

(1) Acquisition Module 11

The acquiring module 11 is configured to perform the acquiring step S101, that is, acquiring display image information, wherein the plurality of pixel units include A pixel unit rows and B pixel unit columns, and wherein the display image information includes a plurality of pixel data, and wherein the plurality of pixel data includes C pixel data rows and D pixel data columns, and wherein C<A and/or D<B.

It is easy to understand that the plurality of pixel units on the display panel will be arranged in an array with a plurality of pixel unit rows or a plurality of pixel unit columns. The plurality of pixel data include a plurality of pixel data rows with different input paths or a plurality of pixel data rows with different input time sequences, wherein the pixel data rows with different input time sequence will be input into different pixel unit rows, and the pixel data columns with different input paths will be input into different pixel unit columns.

It should be noted that the input paths mentioned above are paths selected when different pixel data columns are input to different data lines on the display panel. The input time sequences mentioned above are sequences which the scan lines corresponding to the pixel unit rows are input with the scan signals to enable the pixel unit rows. Specifically, the gate driving circuit on the display panel input scan signals to the scan lines according to the input time sequences to control the corresponding pixel unit rows, and the pixel data columns with different input paths will be input to the data line through the ports that are electrically connected to the data lines. In addition, a plurality of pixel data with the same input path will have different input time sequences, and a plurality of pixel data with different input time sequences will have different input paths. Further, when pixel data with different input paths is input to the corresponding data line, the scan line is input with the scan signal according to the above-mentioned input time sequence, the pixel unit corresponding to the scan line is enabled, and the pixel unit can receive pixel data from its corresponding data line to emit light.

(2) Display Module 12

The display module 12 is configured to perform the first display step S102 and the second display step S103. That is, input the plurality of pixel data into a plurality of data lines corresponding to the B pixel unit columns, and to enable the A pixel unit rows sequentially, to make at least part of the pixel units display according to a same pixel data.

It is easy to understand that since a number of the plurality of pixel units is a*b times a number of the plurality of pixel data (wherein n is a quotient of A divided by C, and wherein m is a quotient of B divided by D), when each pixel data is applied to the n*m pixel units of the display panel for display according to input time sequence and input path, the low-resolution display image information is displayed on the high-resolution display panel.

It should be noted that in this embodiment, the number of pixel unit rows is multiple of the number of pixel data rows. Therefore, it is necessary to apply one pixel data row at any input time sequence to a plurality of pixel unit rows, to achieve the low-resolution display image information displayed on the high-resolution display panel.

For example, please continue to refer to FIG. 3, the display module 12 may specifically include:

A first input sub-unit 121 is configured to perform the first display step S102, that is, input a plurality of pixel data into a plurality of data lines corresponding to the B pixel unit columns.

A second input sub-unit 122 is configured to input the second display step S103, that is, input scan signal to at least one scan line corresponding to a pixel unit rows each time according to the input time sequences, to make each pixel data row is displayed in the corresponding pixel unit rows, wherein n is a quotient of A divided by C.

It is easy to understand that, each time a scan signal is input to at least one scan line corresponding to n pixel unit rows, that is, n pixel unit rows are enabled at any input time sequence. For this input time sequence, each of the pixel data with different input paths will be applied to a pixel unit. After A pixel unit rows are enabled, pixel data rows with different input time sequences will be displayed in A pixel unit rows. That is, each pixel data is displayed in n pixel units of the display panel.

It should be noted that, in this embodiment, each n pixel unit rows compose one display pixel row group. The input time sequences of a same display pixel row group are the same. The same display pixel row group is composed of adjacent n pixel unit rows. And the pixel unit rows of a same display pixel row group are connected to a same scan line. Further, every m pixel unit columns form a display pixel column group, a same display pixel column group is composed of adjacent m pixel unit columns. The pixel unit columns of the same display pixel column group are connected to the same data line.

Further, in this embodiment, the scan line controls one pixel unit row. In some possible variant embodiments, each scan line may also control a plurality of pixel unit rows, or some scan lines control one pixel unit row, and some scan lines control a plurality of pixel unit rows.

It should be noted that the display panel also includes a timing controller (TCON) configured to send display image information, input time sequence, and input path to the acquisition module 11 of the image display device 10. The timing controller has a first resolution. The acquisition module 11 has a second resolution, and the second resolution is greater than the first resolution. Specifically, the second resolution is n*m times the first resolution (wherein n is a quotient of A divided by C, and m is a quotient of B divided by D), and further, the acquiring module 11 is a source driver IC of the display panel.

Different from the prior art, the first embodiment according to the present application provides an image display device 10 applied to a display panel, wherein a plurality of pixel units include A pixel unit rows and B pixel unit columns. The image display device 10 includes: an acquisition module 11 configured to acquire display image information, the display image information includes a plurality of pixel data. The display panel includes a plurality of pixel units. The plurality of pixel units include A pixel unit rows and B pixel unit columns. The plurality of pixel data include C pixel data rows and D pixel data columns, wherein C<A and/or D<B. The first input sub-unit 121 is configured to input a plurality of pixel data into a plurality of data lines corresponding to the B pixel unit columns, the first input sub-unit 121 is configured to input scan signal to at least one scan line corresponding to n pixel unit rows each time according to the input time sequences, to make each pixel data row is displayed in the corresponding pixel unit rows, wherein n is a quotient of A divided by C. According to the image display device provided by the first embodiment of the present application, an enabling time sequence of the pixel unit and an input path of pixel data are controlled by the first input sub-unit 121 and the second input sub-unit 122, to make n pixel unit rows are enabled by at least any one of input time sequence. At this input time sequence, each of the pixel data with different input paths will be applied to n pixel unit rows, so that a low-resolution display image information can be displayed on a high-resolution display panel without using a high-resolution timing controller.

Figure 4:
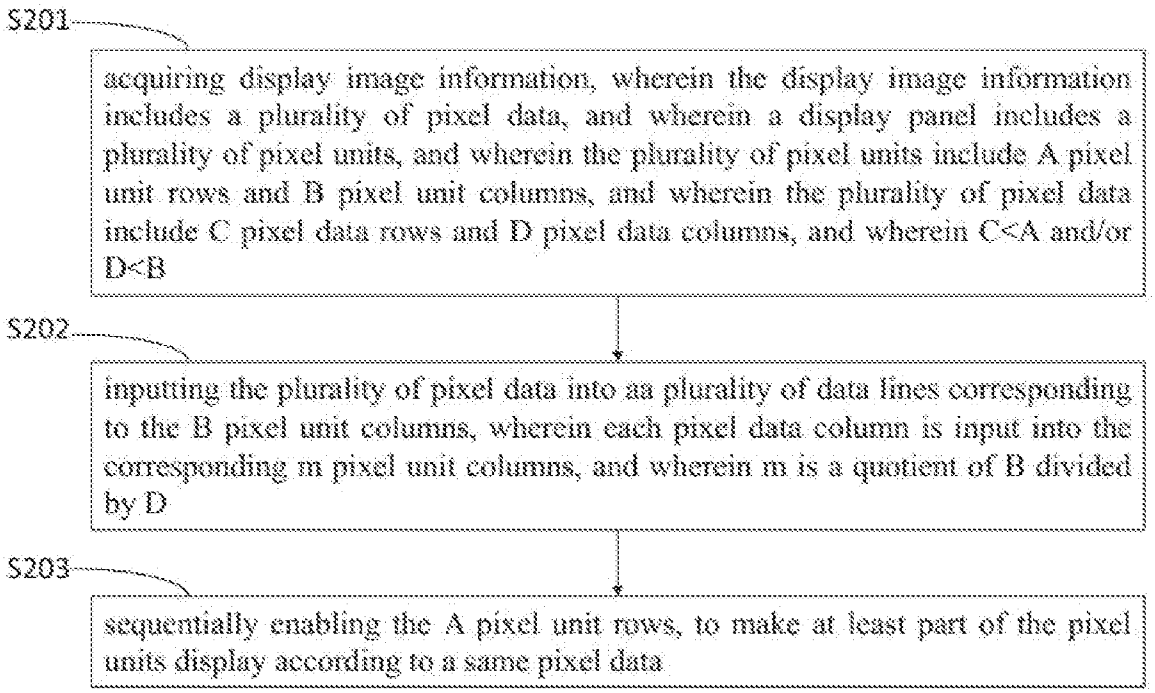
FIG. 4 is a schematic flowchart of the image display method provided by a second embodiment according to the present application.

Please refer to FIG. 4, which is a schematic flowchart of the image display method provided by a second embodiment according to the present application, applied to a display panel, and the specific processes of the image display method provided by the second embodiment according to the present application can be as follows:

acquiring step S201: acquiring display image information, wherein the display image information includes a plurality of pixel data, and wherein a display panel includes a plurality of pixel units, and wherein the plurality of pixel units include A pixel unit rows and B pixel unit columns, and wherein the plurality of pixel data include C pixel data rows and D pixel data columns, and wherein C<A and/or D<B;

first input step S202: inputting the plurality of pixel data into aa plurality of data lines corresponding to the B pixel unit columns, wherein each pixel data column is input into the corresponding m pixel unit columns, and wherein m is a quotient of B divided by D; and second input step S203: sequentially enabling the A pixel unit rows, to make at least part of the pixel units display according to a same pixel data.

The steps of this second embodiment are roughly the same as those of the above-mentioned first embodiment. The difference is that in this embodiment, a multiple relationships between the pixel unit row and the pixel data row, and the pixel unit column and the pixel data column is "2".

It should be noted that since in this embodiment, the number of pixel unit columns is multiple of the number of pixel data columns, it is necessary to apply one pixel data column of a same input path to a plurality of pixel unit columns, to achieve the low-resolution display image information can be displayed on the high-resolution display panel.

It is easy to understand that in the first input step S202 of this embodiment, each m pixel unit columns correspond to a pixel data column of one input path, that is, pixel data columns of one input path will be input to m data lines through the port electrically connected to the data line. After that, when a scan signal is sequentially input to a scan line of the display panel according to the input time sequence to enable a pixel unit row, at the corresponding input time sequence, the pixel data of any input path will be applied to m pixel units, when all the pixel units of the display panel are enabled, B/m pixel data columns with different input paths are displayed in B pixel unit columns. That is, each pixel data is displayed in m pixel units of the display panel.

It should be noted that, in this embodiment, every m pixel unit columns form a display pixel column group, and the same display pixel column group is composed of m adjacent pixel unit columns.

Further, in this embodiment, each data line controls one pixel unit column. In some possible variant embodiments, each data line can also control a plurality of pixel unit columns, or a part of the data lines can control one pixel unit column, and a part of the data lines can control a plurality of pixel unit columns.

Different from the prior art, the second embodiment according to the present application provides an image display method applied to a display panel. The image display method includes: acquiring display image information, wherein the display image information includes a plurality of pixel data, and wherein the display panel includes a plurality of pixel units, and wherein the plurality of pixel units include A pixel unit rows and B pixel unit columns, and wherein the plurality of pixel data include C pixel data rows and D pixel data columns, and wherein C<A and/or D<B, inputting the plurality of pixel data into a plurality of data lines corresponding to the B pixel unit columns, where each pixel data column is input to the corresponding m pixel unit columns, and wherein m is a quotient of B divided by D. After that, the A pixel unit rows are sequentially enabled, to make at least some of the pixel units are displayed according to a same pixel data. According to the image display method provided by the second embodiment of the present application, by controlling the time sequence when the pixel unit is enabled and the path of pixel data input, the pixel data group under an input path can be input to m data lines through the port electrically connected to the data line. After that, when one pixel unit row is enabled, at the corresponding time, the pixel data under any input path will be applied to the m pixel units, so that the low-resolution display image information can be displayed on the high-resolution display panel without using a high-resolution timing controller.

Figure 5:
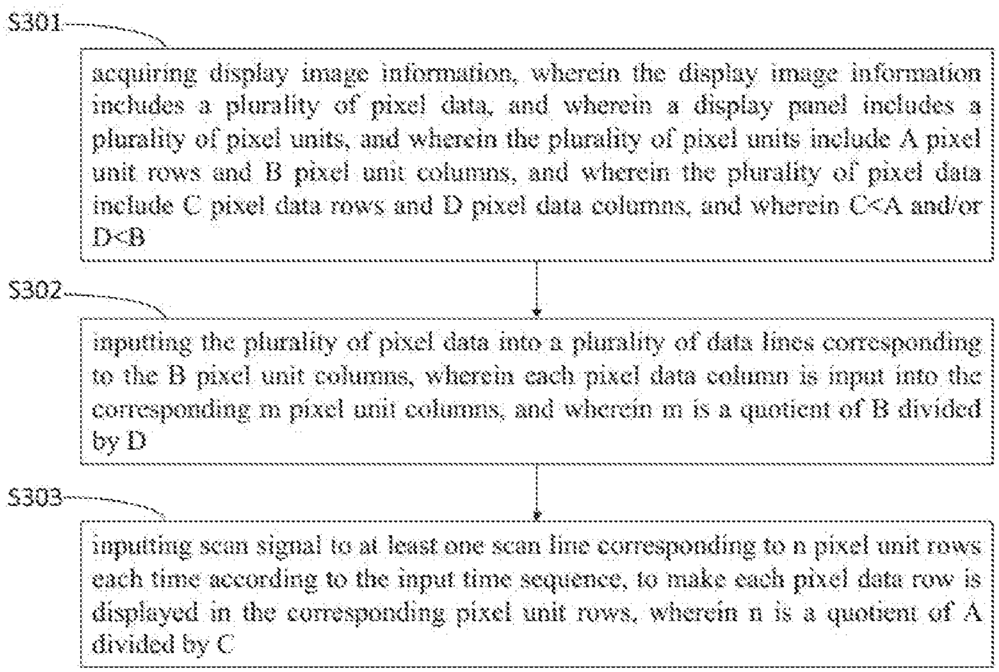
FIG. 5 is a schematic flowchart of the image display method provided by a third embodiment according to the present application.

Please refer to FIG. 5. FIG. 5 is a schematic flowchart of the image display method provided by a third embodiment of the present application, which is applied to a display panel, and the specific process of the image display method provided by the third embodiment of the present application can be as follows:

- acquiring step S301: acquiring display image information, wherein the display image information includes a plurality of pixel data, and wherein a display panel includes a plurality of pixel units, and wherein the plurality of pixel units include A pixel unit rows and B pixel unit columns, and wherein the plurality of pixel data include C pixel data rows and D pixel data columns, and wherein C<A and/or D<B;
- first input step S302: inputting the plurality of pixel data into a plurality of data lines corresponding to the B pixel unit columns, wherein each pixel data column is input into the corresponding m pixel unit columns, and wherein m is a quotient of B divided by D;
- second input step S303: inputting scan signal to at least one scan line corresponding to n pixel unit rows each time according to the input time sequence, to make each pixel data row is displayed in the corresponding pixel unit rows, wherein n is a quotient of A divided by C.

The steps of the third embodiment are roughly the same as those of the first embodiment above. The difference is that in this embodiment, the multiples between the pixel unit rows and the pixel data rows, and the pixel unit columns and the pixel data columns are “3”.

It should be noted that, since in this embodiment, the number of pixel unit rows and the number of pixel data rows, and the number of pixel unit columns and the number of pixel data columns are all in multiples, it is necessary to change A pixel data row of any input time sequence is applied to a plurality of pixel unit rows, and a pixel data column under the same input path needs to be applied to a plurality of pixel unit columns to achieve low-resolution display image information displayed on the high-resolution display panel.

It is easy to understand that in the first input step S302 of this embodiment, each m pixel unit columns correspond to a pixel data column of an input path. That is, the pixel data column under one input path will be input to m data lines through the port electrically connected to the data line. After that, in the second input step S303, each time a scan signal is input to at least one scan line corresponding to n pixel unit rows, n pixel unit rows will be enabled at any input time sequence. Under this input time sequence, the pixel data under any input path will be applied to n*m pixel units. After A pixel unit rows are enabled, A/n pixel data rows with different input time sequences will be displayed in A pixel unit rows, or B/m pixel data columns with different input paths are displayed in B pixel unit columns. That is, each pixel data is displayed in the n*m pixel unit of the display panel.

It should be noted that, in this embodiment, every m pixel unit columns form a display pixel column group, and the same display pixel column group is composed of m adjacent pixel unit columns. Further, in this embodiment, every n pixel unit rows compose a display pixel row group, and the input time sequence in a same display pixel row group is the same, and a same display pixel row group is composed of n adjacent pixel unit rows.

Further, in this embodiment, each scan line controls one pixel unit row, and each data line controls one pixel unit column. In some possible variant embodiments, each scan line can also control a plurality of pixel unit rows, or some scan lines control one pixel unit row, and some scan lines control a plurality of pixel unit rows, and each data line can also control a plurality of pixel unit rows, or some data lines control one pixel unit column, and some data lines control a plurality of pixel unit columns.

Figure 6:
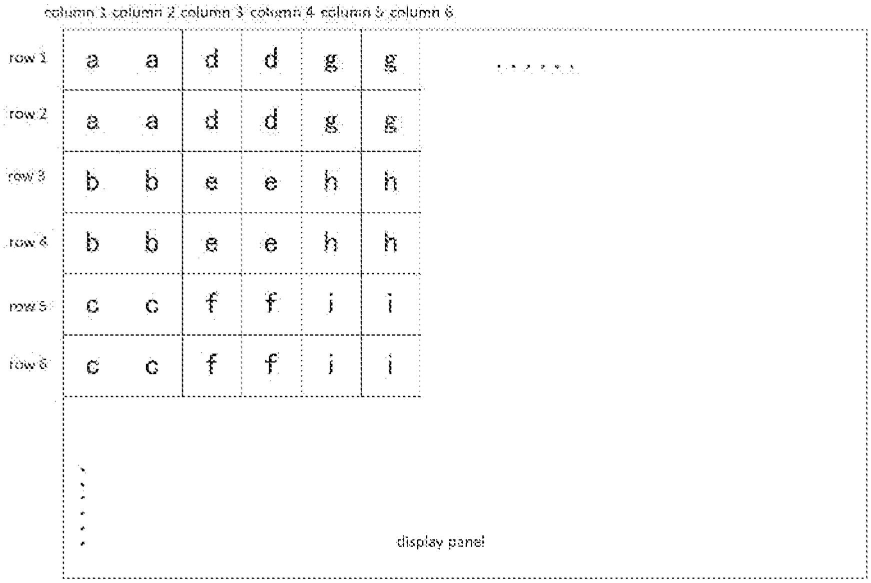
FIG. 6 is a schematic diagram of an application scenario of the image display method provided by the third embodiment according to the present application.

Specifically, please refer to FIG. 6, FIG. 6 is a schematic diagram of an application scenario of the image display method provided by a third embodiment according to the present application. As shown in FIG. 6, a number of pixel unit rows of the display panel is twice the number of pixel data rows with different input time sequences in the display image information, and the number of pixel unit columns of the display panel is twice the number of pixel data columns with different input paths in the display image information. That is, a resolution of the timing controller that sends the display image information is 4 times a resolution of the source driving chip that receives the display image information.

Specifically, from one aspect, in this embodiment, a first pixel data column includes: a, b, and c. As shown in FIG. 6, a first pixel unit column and a second pixel unit column in the display panel (That is, column 1 and column 2) are displayed corresponding to the first pixel data column. Similarly, a second pixel data column includes: d, e, and f. As shown in FIG. 6, a third pixel unit column and a fourth pixel unit column (ie, column 3 and column 4) in the display panel correspond to the second pixel data column. Similarly, a third pixel data column includes: g, h, and i. As shown in FIG. 6, a fifth pixel unit column and a sixth pixel unit column (ie, column 5 and column 6) in the display panel display corresponding to the third pixel data column.

From another aspect, in this embodiment, the first pixel data row includes: a, d, and g. As shown in FIG. 6, a first pixel unit row and a second pixel unit row in the display panel (ie, row 1 and row 2) are displayed corresponding to the first pixel data row. Similarly, a second pixel data row includes: b, e, and h. As shown in FIG. 6, a third pixel unit row and a fourth pixel unit row (ie, row 3 and row 4) are displayed corresponding to the second pixel data row. Similarly, a third pixel data row includes: c, f, and i. As shown in FIG. 6, a fifth pixel unit row and a sixth pixel unit row (ie, row 5 and row 6) in the display panel correspond to the third pixel data row.

After the second input step S303, each pixel data with different input paths and input time sequences (a, b, c, d, e, f as shown in FIG. 6) are applied to 4 pixel units for display.

Different from the prior art, the third embodiment according to the present application provides an image display method applied to a display panel. The image display method includes: acquiring display image information, wherein the display image information includes a plurality of pixel data, and wherein the display panel includes a plurality of pixel units, and wherein the plurality of pixel units include A pixel unit rows and B pixel unit columns, and wherein the plurality of pixel data include C pixel data rows and D pixel data columns, and wherein C<A and/or D<B, inputting the plurality of pixel data into a plurality of data lines corresponding to the B pixel unit columns, where each pixel data column is input to the corresponding m pixel unit columns, and wherein m is a quotient of B divided by D. After that, input a scan signal to at least one scan line corresponding to n pixel unit rows at a time according to the input time sequence, so that each pixel data row is displayed in the corresponding pixel unit row, wherein n is a quotient of A divided by C. According to the third embodiment of the present application, by controlling the path of pixel data input, the pixel data column under one input path can be input to m data lines through the port that is electrically connected to the data line, after that, by controlling the timing of the pixel unit being enabled, n pixel unit rows are enabled at any input time sequence, so that each of pixel data whose input paths and input time sequences are different is applied to n*m pixel units. Therefore, the low-resolution display image information can be displayed on the high-resolution display panel without using a high-resolution timing controller.

It should be noted that in other embodiments according to the present application, n is a power of 2, and/or m is a power of 2. Preferably, n is 2 and m is 2 (That is, the embodiment shown in FIG. 6).

Figure 7:
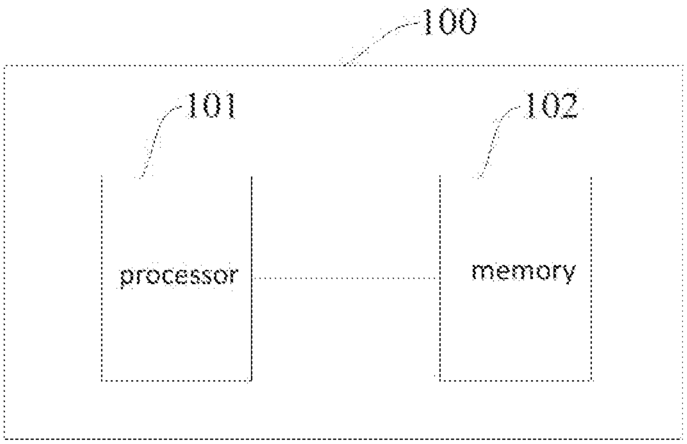
FIG. 7 is a schematic diagram of a hardware structure of a mobile terminal according to one of the embodiments of the present application.

Please refer to FIG. 7. FIG. 7 is a schematic diagram of a hardware structure of a mobile terminal according to one of the embodiments of the present application. The above-mentioned image display device 10 is applied to the mobile terminal. The mobile terminal can be a smart phone or a tablet computer, etc. From the figure, it is very intuitive to see the various components of the present application and the relative position relationship of each component.

As shown in FIG. 7, the mobile terminal 100 includes a processor 101 and a memory 102. The processor 101 and the memory 102 are electrically connected.

The processor 101 is a control center of the mobile terminal 100. It uses various interfaces and lines to connect various parts of the entire mobile terminal. By running or loading the application program stored in the memory 102, and calling the data stored in the memory 102, various functions of the mobile terminal and processing data are executed, so as to monitor the mobile terminal as a whole.

Figure 8:
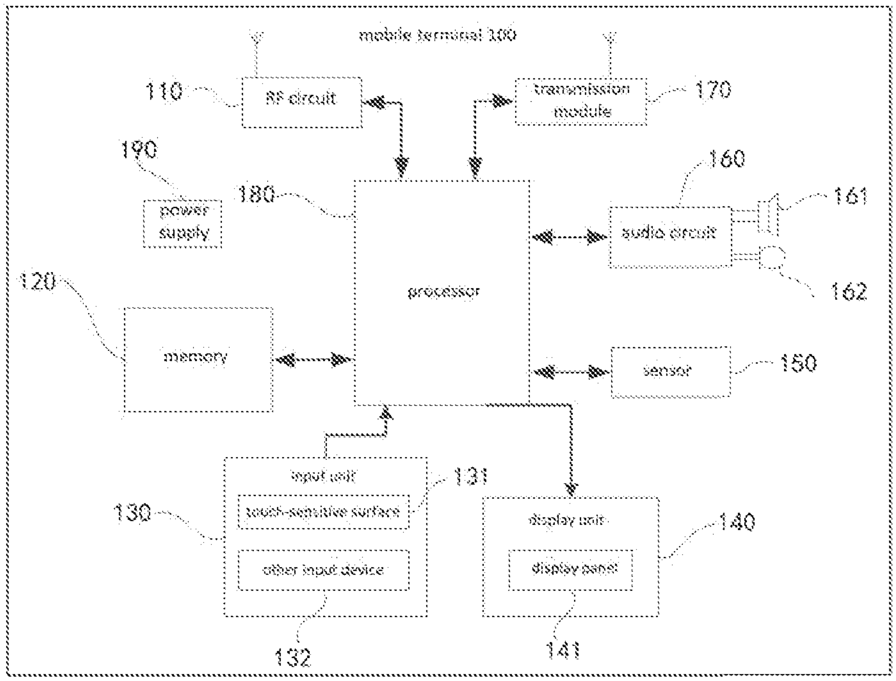
FIG. 8 is a schematic diagram of the hardware structure of the mobile terminal according to one of the embodiments of the present application.

Please refer to FIG. 8. FIG. 8 is a schematic diagram of the hardware structure of the mobile terminal according to one of the embodiments of the present application. The mobile terminal can be a smart phone or a tablet computer. From the figure, it is possible to intuitively see the various components of the present application and the relative positional relationship of the various components.

FIG. 8 shows a specific structural block diagram of a mobile terminal 100 provided by one embodiment of the present application. As shown in FIG. 8, the mobile terminal 100 may include a radio frequency (RF) circuit 110, a memory 120 including one or more computer-readable storage media, an input unit 130, a display unit 140, a sensor 150, an audio circuit 160, a transmission module 170 (for example, wireless fidelity, WiFi), a processor 180 including one or more processing cores, and components such as a power supply 190. Those skilled in the art can understand that the structure of the mobile terminal shown in FIG. 8 does not constitute a limitation on the mobile terminal, and may include more or fewer components than shown in the figure, or combine certain components, or different component arrangements.

The RF circuit 110 is configured to receive and send electromagnetic waves, realize a mutual conversion between electromagnetic waves and electrical signals, and communicate with a communication network or other devices. The RF circuit 110 may include various currently circuit components for performing these functions. For example, an antenna, a radio frequency transceiver, a digital signal processor, an encryption/decryption chip, a subscriber identity module (SIM) card, a memory, and so on. The RF circuit 110 can communicate with various networks such as the Internet, an enterprise intranet, and a wireless network, or communicate with other devices through a wireless network. The aforementioned wireless network may include a cellular telephone network, a wireless local area network, or a metropolitan area network. The above-mentioned wireless network can use various communication standards, protocols and technologies, including but not limited to Global System for Mobile Communication (GSM), Enhanced Data GSM Environment (EDGE), broadband code Wideband Code Division Multiple Access (WCDMA), Code Division Access (CDMA), Time Division Multiple Access (TDMA), and Wireless Fidelity (Wi-Fi) Fi) (such as the American Institute of Electrical and Electronics Engineers standards IEEE 802.11a, IEEE 802.11b, IEEE802.11g and/or IEEE 802.11n), Voice over Internet Protocol (VoIP), Worldwide Interoperability for Microwave Interoperability Microwave Access, Wi-Max), other protocols for mail, instant messaging and short messages, and any other suitable communication protocols, even those that have not yet been developed.

The memory 120 can be used to store software programs and modules, such as the corresponding program instructions in the above-mentioned audio power amplifier control method. The processor 180 executes various functional applications and data processing by running software programs and modules stored in the memory 120, that is, to obtain the frequency of the information transmission signal transmitted by the mobile terminal 100, and generates interference signals and other functions. The memory 120 may include a high-speed random access memory, and may also include a non-volatile memory, such as one or more magnetic storage devices, flash memory, or other non-volatile solid-state memories. In some embodiments, the memory 120 may further include a memory remotely provided with respect to the processor 180, and these remote memories may be connected to the mobile terminal 100 via a network. Examples of the aforementioned networks include, but are not limited to, the Internet, corporate intranets, local area networks, mobile communication networks, and combinations thereof.

The input unit 130 may be configured to receive inputted digital or character information, and generate keyboard, mouse, joystick, optical or trackball signal input related to user settings and function control. Specifically, the input unit 130 may include a touch-sensitive surface 131 and other input device 132. The touch-sensitive surface 131, also called a touch screen or a touchpad, can collect user touch operations on or near it (for example, the user uses any suitable objects or accessories such as fingers, stylus, etc. to operate on or near the touch-sensitive surface 131), and drive the corresponding connection device according to a preset program. Optionally, the touch-sensitive surface 131 may include two parts: a touch detection device and a touch controller. The touch detection device detects the users touch position, and detects the signal brought by the touch operation, and transmits the signal to the touch controller. The touch controller receives the touch information from the touch detection device, converts it into contact coordinates, and sends it to the processor 180, and can receive and execute the commands sent by the processor 180. In addition, the touch-sensitive surface 131 can be implemented in multiple types such as resistive, capacitive, infrared, and surface acoustic wave. In addition to the touch-sensitive surface 131, the input unit 130 may also include other input device 132. Specifically, the other input device 132 may include, but is not limited to, one or more of a physical keyboard, function keys (such as a volume control button, a switch button, etc.), a trackball, a mouse, and a joystick.

The display unit 140 may be configured to display information input by the user or information provided to the user and various graphical user interfaces of the mobile terminal 100. These graphical user interfaces may be composed of graphics, text, icons, videos, and any combination thereof. The display unit 140 may include a display panel 141. Optionally, the display panel 141 may be configured in the form of liquid crystal display (LCD), organic light emitting diode (OLED), etc. Further, the touch-sensitive surface 131 may cover the display panel 141. When the touch-sensitive surface 131 detects a touch operation on or near it, it is transmitted to the processor 180 to determine the type of the touch event, and then the processor 180 provides corresponding visual out one the display panel 141 according to the type of the touch event. The type provides corresponding visual output on the display panel 141. Although in the figure, the touch-sensitive surface 131 and the display panel 141 are used as two independent components to implement input and output functions, in some embodiments, the touch-sensitive surface 131 and the display panel 141 can be integrated to implement input and output functions.

The mobile terminal 100 may also include at least one sensor 150, such as a light sensor, a motion sensor, and other sensors. Specifically, the light sensor may include an ambient light sensor and a proximity sensor. The ambient light sensor can adjust the brightness of the display panel 141 according to the brightness of the ambient light, and the proximity sensor can interrupt when the flip is closed or shutting down. As a kind of motion sensor, a gravity acceleration sensor can detect a magnitude of acceleration in various directions (usually three-axis), and can detect a magnitude and direction of gravity when it is stationary. It can be used to identify mobile phone posture applications (such as horizontal and vertical screen switching, related Games, magnetometer posture calibration), vibration recognition related functions (such as pedometer, percussion), etc. As for other sensors such as gyroscopes, barometers, hygrometers, thermometers, infrared sensors and so on that can be configured in the mobile terminal 100, will not be repeated here.

The audio circuit 160, the speaker 161, and the microphone 162 can provide an audio interface between the user and the mobile terminal 100. The audio circuit 160 can transmit an electric signal converted from the received audio data to the speaker 161, which is converted into a sound signal for output by the speaker 161. On the other hand, the microphone 162 converts the collected sound signal into electric signals, which are received by the audio circuit 160 and then converted into audio data, and then processed by the audio data output processor 180, and then sent to, for example, another terminal through the RF circuit 110, or the audio data is output to the memory 120 for further processing. The audio circuit 160 may also include an earplug jack to provide communication between a peripheral earphone and the mobile terminal 100.

The mobile terminal 100 can help users receive requests, send information, etc. through the transmission module 170 (for example, a Wi-Fi module), and it provides users with wireless broadband Internet access. Although the transmission module 170 is shown in the figure, it is understandable that it is not a necessary component of the mobile terminal 100 and can be omitted as needed without changing the essence of the invention.

The processor 180 is a control center of the mobile terminal 100. It uses various interfaces and lines to connect various parts of the entire mobile phone, runs or executes software programs and/or modules stored in the memory 120, and calls data stored in the memory 120, to perform various functions of the mobile terminal 100 and process data, so as to monitor the mobile terminal as a whole. Optionally, the processor 180 may include one or more processing cores. In some embodiments, the processor 180 may integrate an application processor and a modem processor, wherein the application processor mainly processes with the operating system, user interface, and application programs, and the modem processor mainly deals with wireless communication. It is understandable that the foregoing modem processor may not be integrated into the processor 180.

The mobile terminal 100 also includes a power source 190 (such as a battery) for supplying power to various components. In some embodiments, the power source may be logically connected to the processor 180 through a power management system, to realize the functions of managing charging, discharging, and power consumption through the power management system. The power supply 190 may also include any components such as one or more DC or AC power supplies, a recharging system, a power failure detection circuit, a power converter or inverter, and a power status indicator.

Although not shown, the mobile terminal 100 also includes a camera (such as a front camera, a rear camera, etc.), a Bluetooth module, a flashlight, etc., which will not be repeated here. Specifically, in this embodiment, the display unit of the mobile terminal 100 is a touch screen display.

In addition to the above-mentioned embodiments, the present application can also have other embodiments. All technical solutions formed by equivalent replacements or equivalent replacements fall within a protection scope of the present application.

In summary, although the preferred embodiments of the present application have been disclosed as above, the above preferred embodiments are not intended to limit the present application. Those of ordinary skill in the art can make various modifications without departing from the spirit and scope of the present application. Therefore, the protection scope of the present application is subject to a scope defined by the claims.

What is claimed is:

1. An image display method applied to a display panel comprising a plurality of pixel units, wherein the plurality of pixel units comprise A pixel unit rows and B pixel unit columns, and wherein the image display method comprises:

acquiring display image information, wherein the display image information comprises a plurality of pixel data, and wherein the plurality of pixel data comprise C pixel data rows and D pixel data columns, and wherein C<A and/or D<B;

inputting the plurality of pixel data into a plurality of data lines corresponding to the B pixel unit columns; and enabling the A pixel unit rows sequentially, to make at least part of the pixel units display according to a same pixel data, wherein input time sequences of the C pixel data rows are at least partially different, and wherein the step of enabling the A pixel unit rows sequentially, to make at least part of the pixel units display according to a same pixel data comprises:

inputting scan signal to at least one scan line corresponding to n pixel unit rows each time according to the input time sequences, to make each pixel data row is displayed in the corresponding pixel unit rows, wherein n is a quotient of A divided by C.

2. The image display method according to claim 1, wherein each n pixel unit rows compose a display pixel row group, and wherein input time sequences of a same display pixel row group are the same.

3. The image display method according to claim 2, wherein a same display pixel row group is composed of n adjacent pixel unit rows.

4. The image display method according to claim 1, wherein the step of inputting the plurality pixel data into the plurality data lines corresponding to the B pixel unit columns specifically comprises:

inputting the plurality of pixel data into a plurality of data lines corresponding to the B pixel unit columns, wherein each pixel data column is input into the corresponding m pixel unit columns, and wherein m is a quotient of B divided by D.

5. The image display method according to claim 4, wherein each m pixel unit columns compose a display pixel column group, and a same display pixel column group is composed of m adjacent pixel unit columns.

6. The image display method according to claim 1, wherein n*m pixel units are displayed according to a same pixel data, and wherein n is a quotient of A divided by C, and wherein m is a quotient of B divided by D.

7. An image display device applied to a display panel comprising a plurality of pixel units, wherein the plurality of pixel units comprise A pixel unit rows and B pixel unit columns, and wherein the image display device comprises:

an acquisition module configured to acquire display image information, wherein the display image information comprises a plurality of pixel data, and wherein the plurality of pixel data comprise C pixel data rows and D pixel data columns, and wherein C<A and/or D<B;

a display module configured to input the plurality of pixel data into a plurality data lines corresponding to the B pixel unit columns, and to enable the A pixel unit rows sequentially, to make at least part of the pixel units display according to a same pixel data, wherein the input time sequences of the C pixel data rows are at least partially different, and wherein the display module comprises:

a first input sub-unit configured to input scan signal to at least one scan line corresponding to n pixel unit rows each time according to the input time sequences, to make each pixel data row is displayed in the corresponding pixel unit rows, wherein n is a quotient of A divided by C.

8. The image display device according to claim 7, wherein the display panel further comprises a timing controller configured to send the display image information to the acquisition module, wherein the timing controller has a first resolution, and wherein the acquisition module has a second resolution, and wherein the second resolution is greater than the first resolution.

9. The image display device according to claim 7, wherein each n pixel unit rows compose a display pixel row group, and wherein input time sequences of a same display pixel row group are the same.

10. The image display device according to claim 9, wherein the pixel unit rows of a same display pixel row group are connected to a same scan line.

11. The image display device according to claim 7, wherein the display module comprises:

a second input sub-unit configured to input the plurality of pixel data into a plurality of data lines corresponding to the B pixel unit columns, wherein each pixel data column is input into the corresponding m pixel unit columns, and wherein m is a quotient of B divided by D.

12. The image display device according to claim 11, wherein each m pixel unit columns compose a display pixel column group, and a same display pixel column group is composed of m adjacent pixel unit columns.

13. The image display device according to claim 12, wherein the pixel unit columns of a same display pixel column group are connected to a same data line.

14. A mobile terminal, wherein the mobile terminal comprises an image display device applied to a display panel comprising a plurality of pixel units, and wherein the plurality of pixel units comprise A pixel unit rows and B pixels unit columns, and wherein the image display device comprises:

an acquisition module configured to acquire display image information, wherein the display image information comprises a plurality of pixel data, and wherein the plurality of pixel data comprise C pixel data rows and D pixel data columns, and wherein C<A and/or D<B; and a display module configured to input the plurality of pixel data into a plurality data lines corresponding to the B pixel unit columns, and to enable the A pixel unit rows sequentially, to make at least part of the pixel units display according to a same pixel data, wherein input time sequences of the C pixel data rows are at least partially different, and wherein the display module comprises:

a first input sub-unit configured to input scan signal to at least one scan line corresponding to n pixel unit rows each time according to the input time sequences, to make each pixel data row is displayed in the corresponding pixel unit rows, wherein n is a quotient of A divided by C.

15. The mobile terminal according to claim 14, wherein each n pixel unit rows compose a display pixel row group, and wherein input time sequences of a same display pixel row group are the same.

16. The mobile terminal according to claim 14, wherein the display module comprises:

a second input sub-unit configured to the plurality of pixel data into a plurality of data lines corresponding to the B pixel unit columns, wherein each pixel data column is input into the corresponding m pixel unit columns, and wherein m is a quotient of B divided by D.

17. The mobile terminal according to claim 16, wherein each m pixel unit columns compose a display pixel column group, and a same display pixel column group is composed of m adjacent pixel unit columns.

* * * * *